(No Model.)
T. O'MAHONY.
LUNCH HEATER.
No. 399,922. Patented Mar. 19, 1889.
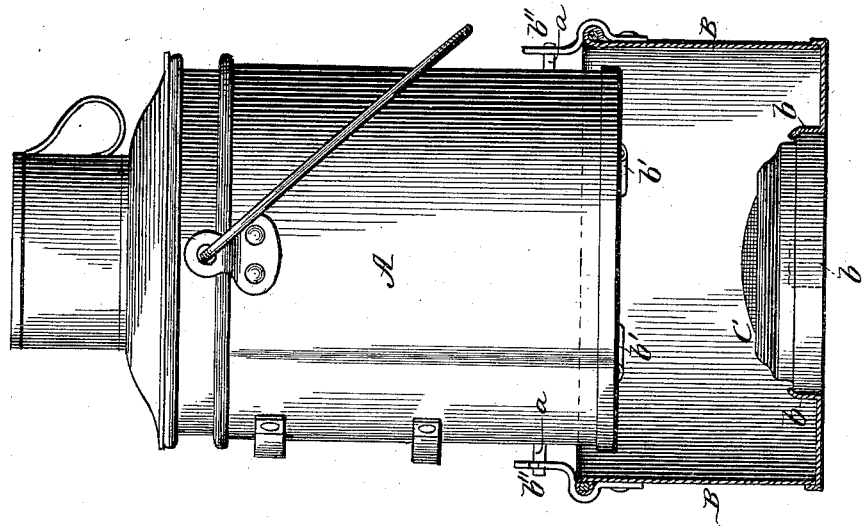
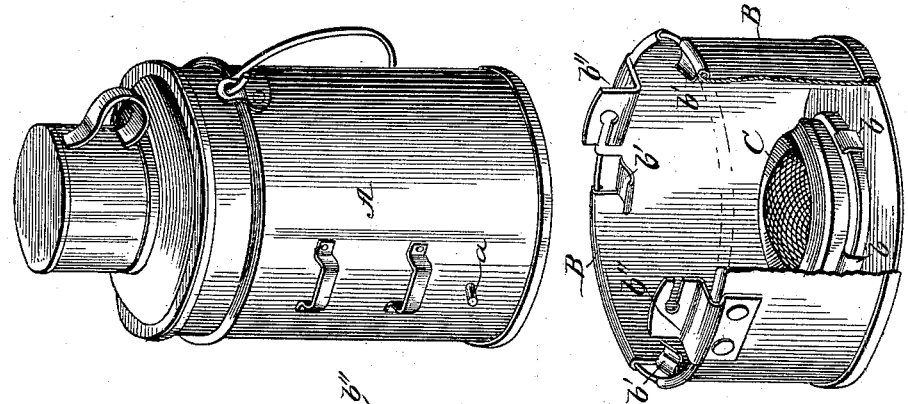
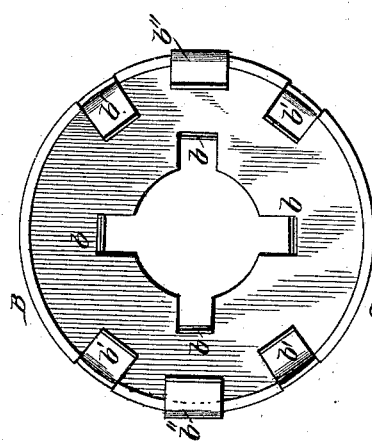
WITNESSES:
INVENTOR:
Timothy O'Mahony
BY
ATTORNEYS.

UNITED STATES PATENT OFFICE.

TIMOTHY O'MAHONY, OF FELTON, CALIFORNIA.

LUNCH-HEATER.

SPECIFICATION forming part of Letters Patent No. 399,922, dated March 19, 1889.

Application filed December 1, 1888. Serial No. 292,431. (No model.)

*To all whom it may concern:*

Be it known that I, TIMOTHY O'MAHONY, of Felton, in the county of Santa Cruz and State of California, have invented a new and useful Improvement in Lunch-Heaters, of which the following is a specification.

My invention is an improvement in the class of lamp stoves or heaters for culinary vessels, and is particularly intended for use as a heater for workmen's lunch or dinner pails. The body of the heater is preferably constructed of sheet-iron, in the form of a cylinder, having an open top and provided with devices for support of and attachment to the dinner-pail and for holding the lamp in place.

The features of novelty are hereinafter described in connection with others not claimed as new.

In the accompanying drawings, Figure 1 is a perspective view of the heater and a dinner-pail separated. Fig. 2 is a vertical section of the heater and pail arranged in the position required for heating the latter. Fig. 3 is a plan view of the heater, the lamp being removed.

The pail A has no peculiarity of construction save the studs $a\ a$, which project laterally from opposite sides near its bottom. The heater B is constructed of sheet metal of suitable thickness. I preferably employ sheet-iron—such as common stove-pipe is usually made of. The form of the heater B is cylindrical, the top being open. An alcohol-lamp, C, is secured centrally on the bottom of the heater by means of spring-claws $b$, which project upward from the said bottom, and are preferably formed integrally with it by cutting out the center, then slitting the surrounding portion radially and bending up the tongues thus produced. The elasticity of the claws $b$ permits the lamp C to be easily inserted or removed.

The pail A is supported while being heated by means of arms $b'$, which project inwardly from the upper portion of the heater. I preferably form these by slitting the sides of the heater vertically and bending inward the narrow tongues thus formed. The arms $b'$ may, however, be formed of separate pieces and riveted to the body of the heater. Notched lugs or ears $b''$ project upward from the upper edge of the heater, to which they are permanently attached at opposite points. These lugs serve as a means for holding the pail A in place on its supports $b''$, and for connecting the pail and heater together, so that they may be carried suspended by the bail of the pail even while the lamp C is burning. It will be noted that notches in lugs $b''$ open on opposite or reverse sides.

When it is desired to heat the contents of the pail, the lamp is lighted and the pail placed on the arms $b'$ and turned on its axis until the studs $a\ a$ enter the notches in lugs $b''$. It will be noted the said notches are enlarged at their inner ends, thus providing sockets for the studs $a$, which prevent or tend to prevent their accidental detachment.

What I claim is—

1. The cylindrical heater constructed of sheet metal and having an open top, and provided with inwardly-projecting arms for supporting the dinner-pail, and notched lugs for connecting with studs on the pail, as shown and described.

2. The combination of the pail having laterally-projecting studs with the heater having vertical notched lugs and supports for said pail, substantially as shown and described.

TIMOTHY O'MAHONY.

Witnesses:
 A. D. LEMON,
 H. E. MAKINNEY.